United States Patent
D'Ercoli et al.

(10) Patent No.: US 12,366,686 B2
(45) Date of Patent: Jul. 22, 2025

(54) OPTICAL SYSTEMS AND METHODS FOR ACTIVE AUTOFOCUS

(71) Applicant: Datalogic IP Tech S.R.L., Calderara Di Reno (IT)

(72) Inventors: Francesco D'Ercoli, Bologna (IT); Matteo Del Castello, Capua (IT); Marco Cumoli, Monte San Pietro (IT)

(73) Assignee: Datalogic IP Tech S.r.l., Calderara di Reno (IT)

(*) Notice: Subject to any disclaimer, the term of this patent is extended or adjusted under 35 U.S.C. 154(b) by 923 days.

(21) Appl. No.: 17/525,678

(22) Filed: Nov. 12, 2021

(65) Prior Publication Data

US 2023/0152497 A1 May 18, 2023

(51) Int. Cl.
*G02B 3/14* (2006.01)
*G01S 7/481* (2006.01)
*G01S 7/497* (2006.01)

(52) U.S. Cl.
CPC ............... *G02B 3/14* (2013.01); *G01S 7/481* (2013.01); *G01S 7/497* (2013.01)

(58) Field of Classification Search
CPC ............ G02B 3/14; G01S 7/481; G01S 7/497
See application file for complete search history.

(56) References Cited

U.S. PATENT DOCUMENTS

| | | | |
|---|---|---|---|
| 4,640,620 A | 2/1987 | Schmidt | |
| 10,146,975 B2 | 12/2018 | Canini et al. | |
| 11,525,978 B2 * | 12/2022 | Kubo | H04N 23/67 |
| 2008/0245872 A1 | 10/2008 | Good | |
| 2015/0310243 A1 | 10/2015 | Ackley et al. | |
| 2017/0320165 A1 * | 11/2017 | Hyakumura | B23K 26/046 |
| 2020/0034591 A1 | 1/2020 | Bachelder et al. | |
| 2020/0041865 A1 * | 2/2020 | Hamann | G02B 27/46 |

OTHER PUBLICATIONS

"Kirby Cheng AP186: Activity 7: Properties of the 2D Fourier Transform", http://kirbycheng.blogspot.com/2011/07/activity-7-properties-of-2d-fourier.html, dated Jul. 14, 2011, 4 pages.
"Laboratory 7: Fourier Optics", 1051-455-20073, Physical Optics, https://www.cis.rit.edu/class/simg455/lab7-20073-fourier-optics.pdf, 5 pages.

* cited by examiner

Primary Examiner — Nathanael R Briggs
(74) Attorney, Agent, or Firm — Foley & Lardner LLP (57) ABSTRACT

Systems and methods for autofocus may include a light source for generating a light wave and a varifocal lens arranged in front of the light source. The varifocal lens may receive the light wave and generate a Fourier transform of a known semi-transparent pattern positioned on the rear focal plane (or input plane) of the varifocal lens therefrom. An image sensor may receive the Fourier transform carried by the light wave after being reflected from an object. A focus tunable lens may be arranged in front of the image sensor and through which the reflected light wave passes. A processor may adjust a focal length of the varifocal lens to cause the Fourier transform carried by the light wave to form a predefined (expected) pattern detected by the image sensor, and adjust a control parameter of the focus tunable lens until one or more spatial frequencies of the predefined pattern detected at the image sensor match one or more predefined spatial frequencies.

20 Claims, 8 Drawing Sheets

OPTICAL SYSTEMS AND METHODS FOR ACTIVE AUTOFOCUS

BACKGROUND

Autofocus (AF) methods and systems may be classified among active, passive or hybrid types. Active AF systems may measure the distance to the object to be imaged independently of an optical system using, for example, ultrasonic sound waves, infrared light or time-of-flight (ToF) technology. The active AF systems or devices are able to properly adjust the optical system for correct focus based on a measured distance to an object. Passive AF systems may focus correctly by only analyzing an image captured by an optical system. For example, passive AF systems may use phase detection, contrast measurement, image gradients, and/or image energy to determine the correct focus.

From the mechanical point-of-view, AF may be performed by a motor directly embedded in a camera body or by electronically transmitting control information to moving contacts in a mount plate in a lens.

A number of devices often include autofocusing systems to optimize depth-of-fields. Such devices include 2D readers that utilize liquid lenses that use electrical charges to change the shape of an interface between oil and water to bend light to bring an image into focus quickly without moving parts or electrical motors to move focal lenses. Linear vision systems include a linear sensor placed on a moving board. Handheld devices and unattended laser scanners also use autofocusing systems.

SUMMARY

Autofocusing systems (e.g., passive AF systems) that rely on image features to optimize the focus suffer serious limitations under poor or non-uniform lighting conditions. To overcome the problem of conventional autofocusing systems, an economic and effective autofocus system and process for optical systems is provided. An autofocus system and process may be implemented by utilizing a dedicated optical system to automatically adjust optical elements of the optical systems themselves to capture images with correct focus (autofocus or AF) on an image sensor (e.g., having a voltage-controlled liquid lens) of a vision camera device. The process is based on a Fourier-optics projection to be performed by a zoom lens of a known pattern composed of known spatial frequencies on a scene (i.e., object) on which the system is to be focused. The frequency set, once reacquired by the image sensor, may be analyzed and inherent frequency distortion may be corrected by modifying the focal length of the zoom lens of the optical system along with at least one parameter of a sensor focus tunable lens associated to the image sensor. As soon as the frequency distortion of the reacquired frequencies is low enough (given a convergence of the process), further fine tuning of the sensor focus tunable lens may be applied by using a static calibration table.

One embodiment of an imaging system may include a light source for generating a light wave and a varifocal lens or zoom lens, as further described herein, arranged in front of the light source. The varifocal lens may be configured to receive the light wave after the light wave has passed through a semi-transparent pattern (e.g., a pattern that causes a portion of the light wave to pass therethrough) on a rear focal plane of the varifocal lens, and generate a Fourier transform of the semi-transparent pattern therefrom. The imaging system may further include an image sensor arranged to receive the Fourier transform carried by the light wave after being reflected from an object. The imaging system may also include a focus tunable lens positioned in front of the image sensor, and through which the reflected light wave passes. The imaging system may also include a processor configured to adjust a focal length of the varifocal lens to cause the Fourier transform carried by the reflected light wave to form a predefined pattern detected by the image sensor. The processor may adjust a control parameter of the focus tunable lens until one or more spatial frequencies of the predefined pattern detected at the image sensor match one or more predefined spatial frequencies.

In some implementations, the focus tunable lens may be arranged (e.g., positioned and/or oriented) such that an optical axis of the focus tunable lens is transverse to an optical axis of the varifocal lens, and the imaging system may include an optical path splitter arranged to direct the Fourier transform carried by the light wave reflected from the object towards the focus tunable lens. The optical path splitter may include a semi-transparent mirror. In some implementations, the focus tunable lens may be arranged such that an optical axis of the focus tunable lens is parallel to an optical axis of the varifocal lens.

In some implementations, the processor may be configured to fine-tune the focal length of the varifocal lens upon detecting the predefined pattern of the Fourier transform carried by the light wave. In fine-tuning the focal length of the varifocal lens, the processor (i) may determine a distance between two blobs in an image captured by the camera sensor and that represent the Fourier transform carried by the light wave, and (ii) may modify the focal distance of the varifocal lens based on the distance between two blobs.

In some implementations, the light wave may be a planar light wave. In some implementations, the focus tunable lens may be a liquid lens and the control parameter includes a control voltage of the liquid lens. In some implementations, the light source may be a laser. In some implementations, the processor may use a focusing table in adjusting the control parameter of the focus tunable lens.

One embodiment of a method may include emitting, by a light source, a light wave to propagate through a varifocal lens arranged in front of the light source, where the varifocal lens may be configured to receive the light wave and generate a Fourier transform of a known transparent pattern positioned on a rear focal plane (or input plane) of the varifocal lens carried by the light wave. The method may include receiving, by an image sensor via a focus tunable lens, the Fourier transform carried by the light wave after being reflected from an object. The method may include adjusting, by a processor, a focal length of the varifocal lens to cause the Fourier transform carried by the light wave to form a predefined pattern detected at the image sensor. The method may include the processor adjusting a control parameter of a focus tunable lens arranged in front of the image sensor until one or more spatial frequencies of the predefined pattern detected at the image sensor match one or more predefined spatial frequencies.

In some implementations, the focus tunable lens may be arranged (e.g., positioned and/or oriented) such that an optical axis of the focus tunable lens is transverse to an optical axis of the varifocal lens. The method may further include directing, by an optical path splitter, the Fourier transform carried by the light wave reflected from the object towards the focus tunable lens. The optical path splitter may include a semi-transparent mirror. In some implementations, the focus tunable lens may be arranged such that an optical axis of the focus tunable lens is parallel to an optical axis of the varifocal lens.

In some implementations, the method may further include the processor fine-tuning the focal length of the varifocal lens upon detecting the predefined pattern of the Fourier transform carried by the light wave. Fine-tuning the focal length of the varifocal lens may include determining a distance between two blobs in an image captured by the camera sensor and representing the Fourier transform carried by the light wave. The focal distance of the varifocal lens may be modified based on the distance between two blobs.

In some implementations, the light wave may be a planar light wave. In some implementations, the focus tunable lens may be a liquid lens and the control parameter may include a control voltage of the liquid lens. In some implementations, the light source is a laser. In some implementations, adjusting the control parameter of the focus tunable lens may include using a focusing table.

The processes and systems described herein enable an imaging device to focus on an object not presenting relevant discontinuities in the color gradient (e.g. edges), thereby avoiding the so-called "focus hunting" (i.e., an oscillation of the focusing system around the ideal plane of focus) as compared to traditional contrast detection techniques (and in some cases also more accurate phase detection systems).

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Imaging devices, such as barcode readers, may be classified into two categories based on the autofocus systems and methods employed and the way the correct focus is set. A first category includes imaging devices that detect the distance to the device to be imaged and set the correct focus based on the detected distance. The distance to the object may be detected using, for example, ultrasonic sound waves, infrared light or time-of-flight (ToF) technology.

The second category includes devices (e.g., barcode readers) that set the best focus only one time (e.g., daily) during installation of the devices. The set focus does not change during run time (e.g., reading barcodes), and the focus is reset periodically or aperiodically (e.g., next day). Devices in this category usually rely on the intrinsic depth-of-field of the optical system to account for relatively small variations in the distance to objects from which barcodes are read. The devices in the second category usually employ passive autofocus procedures that are usually based on the analysis of the contrast gradients or energies of the acquired images. However, passive autofocus techniques based on image analysis may not be reliable in lighting conditions characterized with poor lighting and/or uneven lighting, among others. Such lighting conditions may result in non-uniform or lack of transition gradients in the acquired images, which results in errors in determining the focusing plane.

In the current disclosure, more reliable autofocus systems and approaches than those conventionally utilized are described. A light source (e.g., a laser source) may emit a light wave that is transformed, after passing through a semi-transparent pattern in input, into a spatial Fourier transform by a varifocal lens. The Fourier transform carried by the light wave may be reflected from an object to be detected or captured by an image sensor having a tunable focus lens. The Fourier transform carried by the reflected light wave depicts a predefined frequency pattern that may be detected at the image sensor. When both the varifocal lens and the tunable focus lens have the correct focus, the predefined frequency pattern with the expected frequency characteristics may be detected in an image acquired by the image sensors. The autofocus systems and methods described herein include adjusting the focal length of the varifocal lens and the focusing distance of the tunable focus lens until the predefined frequency pattern (with the expected frequency characteristics) is detected at the image sensor.

Figure 1:
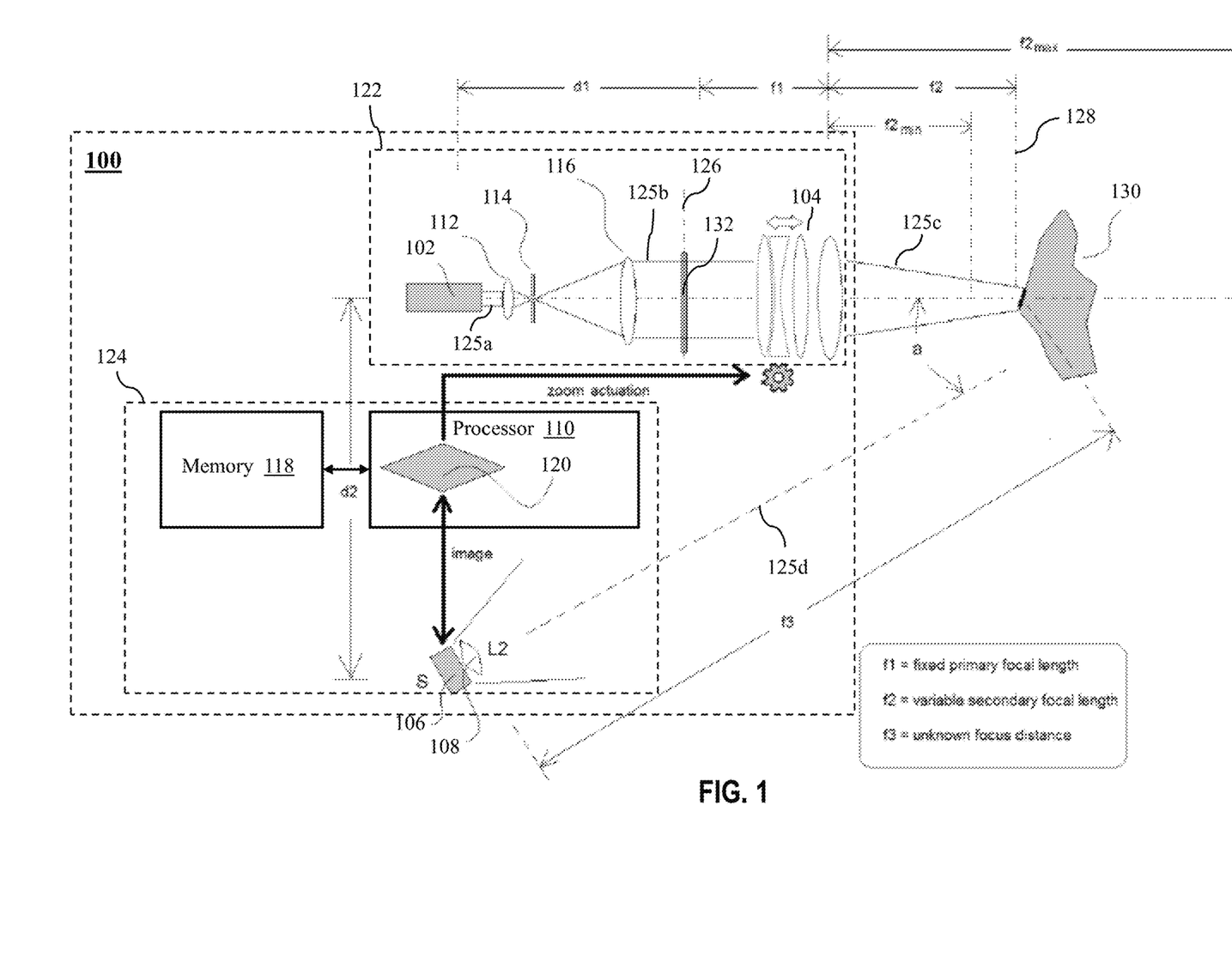
FIG. 1 shows a block diagram of imaging system (or optical system) that employs a novel autofocus mechanism, according to example embodiments.

Referring to FIG. 1, a block diagram of an imaging system 100 (also referred to as an optical system 100) that employs an autofocus mechanism is shown, according to example embodiments. In brief overview, the imaging system 100 may include a light source 102 and a varifocal lens 104 (also referred to herein as a zoom lens 104) arranged in front of the light source 102. The imaging system 100 may include an image sensor (e.g., photodetector) 106 and a focus tunable lens 108 arranged in front of the image sensor 106. The imaging system 100 may include a processor 110 configured (i) to adjust a focal length of the varifocal lens 104, and (ii) to adjust a control parameter of the focus tunable lens 108 to achieve autofocus calibration. The light source 102 may have or may be associated with an objective lens 112, a pinhole 114 and a collimating lens 116. The imaging system 100 may also include a memory 118 that stores computer code instructions. The computer code instructions may be configured to perform an autofocus logic 120 when executed by the processor 110. The autofocus logic 120 may determine or calibrate one or more reading distances. A reading distance may be a distance between the focus tunable lens 108 and an object depicting a QR code (or other type of machine-readable code) to be read and decoded by the imaging system 100 using the image sensor 106.

The imaging system 100 may be viewed as including two main branches: a first branch 122 that generates a light wave and a second branch 124 that receives a reflected version of the light wave and calibrates one or more optical elements of the imaging system 100. The first branch 122 may include a number of optical elements, including the light source 102, the objective lens 112, the pinhole 114, the collimating lens 116, and the varifocal lens 104. The second branch 124 may include a number of optical and electronic elements, including the image sensor 106, the focus tunable lens 108, the processor 110, and the memory 118.

The light source 102 may generate an incident light wave 125a on a rear focal plane (or input plane) 126 of the varifocal lens 104. The rear focal plane 126 is located at a fixed distance f1 from the varifocal lens 104. The incident light wave 125a may be a uniform plane wave. The objective lens 112, the pinhole 114 and the collimating lens 116 may be arranged, in this order, in front of the light source 102. The objective lens 112, the pinhole 114, and the collimating lens 116 may transform the incident light wave 125a into the parallel incident light wave 125b. The parallel incident light wave 125b may be directed to enter the varifocal lens 104. In some implementations, the light source 102 may be laser source.

The varifocal lens 104 is a lens with a variable or adjustable focal length, such that focus changes as focal length (and magnification) changes in an embodiment. The varifocal lens 104 may receive the input light wave (e.g., the light wave output by the collimating lens 116), and generate a Fourier transform (e.g., spatial Fourier transform) of a known semi-transparent pattern 132 positioned on the rear focal plane (or input plane) 126 therefrom. The varifocal lens 104 may generate the Fourier transform of the parallel incident light wave 125b after passing through the semi-transparent pattern 132 in input as an output incident light wave 125c on its front focal plane (or output plane) 128, e.g., at focal length f2 from the varifocal lens 104. In other words, the output incident light wave 125c output by the varifocal lens 104 may represent the spatial Fourier transform of the parallel incident light wave 125b received by the varifocal lens 104. The zoom lens (or varifocal lens) 104 may have a defined focal range between a minimum focal length $f2_{min}$ and a maximum focal length $f2_{max}$. For example, $f2_{min}$ may be equal to 30 mm and $f2_{max}$ may be equal to 250 mm. As discussed in further detail below, applying the Fourier transform to the parallel incident light wave 125b (e.g., uniform planar wave) that is incident to varifocal lens 104 may result into an output incident light wave 125c having a predefined pattern.

When the front focal plane 128 of the varifocal lens 104 is positioned on an object 130, the output incident light wave 125c (or the corresponding pattern) may be reflected from the object 130. The image sensor 106 may be arranged to receive the reflected light wave 125d, which represents a version of the output incident light wave 125c that is reflected from the object 130. The reflected light wave 125d passes through the focus tunable lens 108 before the image sensor 106 records an image of the Fourier transform or the corresponding pattern. The focus tunable lens 108 may be a lens of the image sensor 106. In some implementations, the focus tunable lens 108 may be a liquid lens. The focus tunable lens 108 or the image sensor 106 may be placed at a distance f3 from the object 130 or the output focal plane 128. The distance f3 may represent the focal distance of the focus tunable lens 108. There exists a mathematical relation between focal length f2 and the focal distance f3. For example, the focal distance f3 of the focus tunable lens 108 may be proportional to the focal length f2 of the varifocal lens 104 plus a constant offset depending on the geometry of the imaging system 100.

The processor 110 may be operatively or communicatively connected to the varifocal lens 104 and the focus tunable lens 108. The processor 110 may cause adjustment of the focal length f2 and the focal distance f3 as part of the autofocus logic 120 executed by the processor 110. The autofocus logic 120 or the autofocus process executed by the processor may be implemented as computer code instructions. The computer code instructions may be stored by the memory 118 and executed by the processor 110. The autofocus process or method executed by the processor 110 is described in further detail with regard to FIGS. 2 and 3 below.

Figure 2:
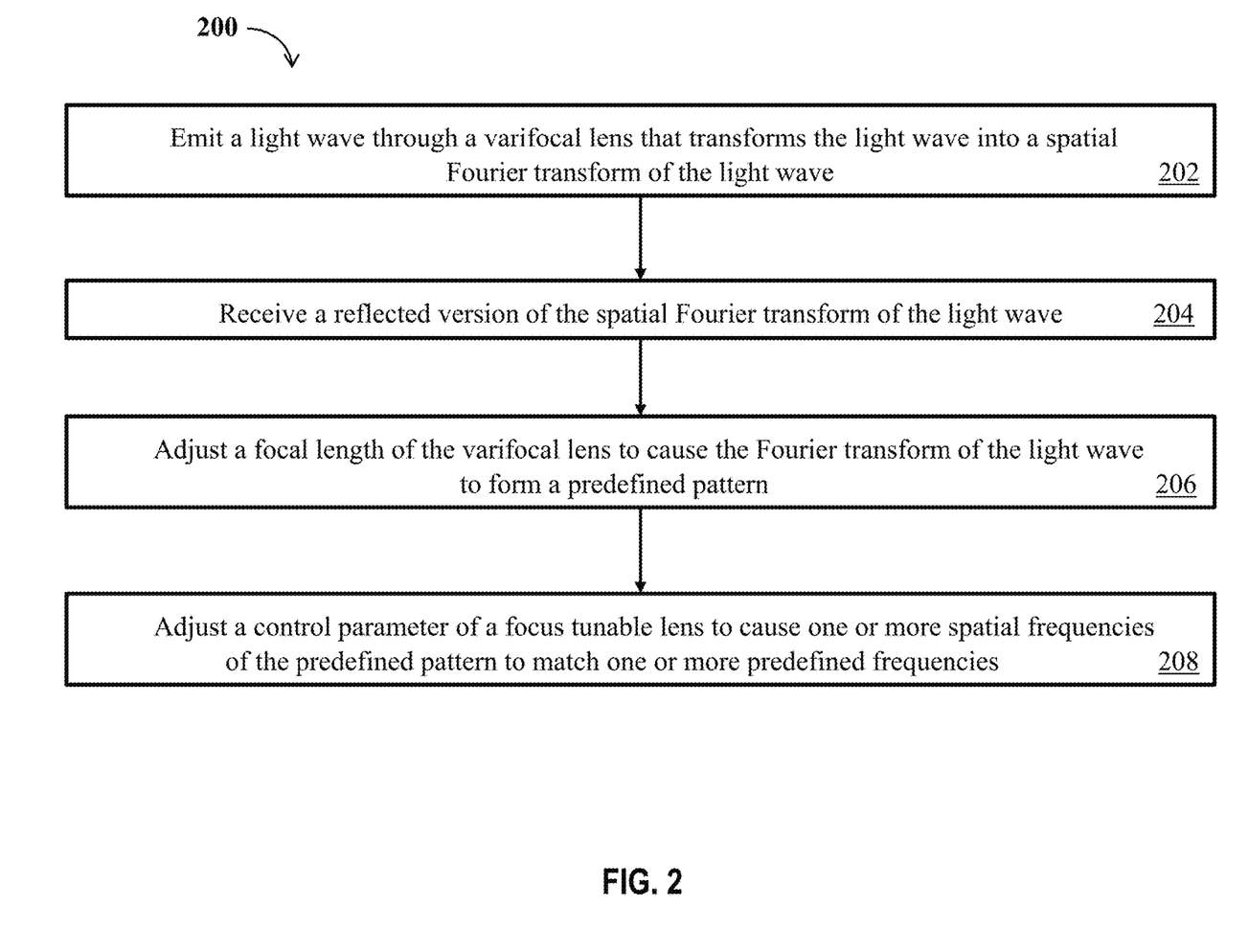
FIG. 2 is flowchart illustrating an autofocus method, according to example embodiments.

Referring to FIG. 2, a flowchart illustrating an autofocus method 200 is shown, according to example embodiments. The method 200 may include emitting a light wave through a varifocal lens that transforms the light wave into a spatial Fourier transform carried by the output light wave at step 202. The output light wave may be reflected by an object. The method 200 may further include receiving a reflected version of the spatial Fourier transform carried by the reflected light wave at step 204. At step 206, the method 200 may include adjusting a focal length of the varifocal lens to cause the Fourier transform carried by the reflected light wave to form a predefined pattern detected by the image sensor. The method 200 may include adjusting a control parameter of a focus tunable lens to cause one or more spatial frequencies of the predefined pattern detected at the image sensor to match one or more predefined spatial frequencies at step 208.

As an example, the method 200 may be performed by the imaging system 100 during an installation phase or calibration phase of the imaging system 100 (i) to calibrate parameters of the varifocal lens 104 and the focus tunable lens 108 and (ii) to achieve the correct focus at the image sensor 106. Referring to FIGS. 1 and 2, the method 200 may include the light source 102 emitting a light wave through the varifocal lens 104, which transforms the light wave into a spatial Fourier transform carried by the light wave (of a known transparent pattern 132 positioned on the rear focal plane or input plane 126) at step 202. The light source 102 may emit a uniform planar wave. In some implementations, the light source 102 may include a laser source. The emitted light wave may pass through the objective lens 112, the pinhole 114, and the collimating lens 116 and a known transparent pattern 132 positioned on the rear focal plane or input plane 126 before entering the varifocal lens 104. The objective lens 112, the pinhole 114 and the collimating lens 116 may make parallel the rays of the light wave at the input plane 126 of the varifocal lens 104. The varifocal lens 104 may transform the incident light wave to an output light wave representing a spatial Fourier transform of the incident light wave that passed through a known transparent pattern 132 positioned on the rear focal plane or input plane 126.

Figure 3:
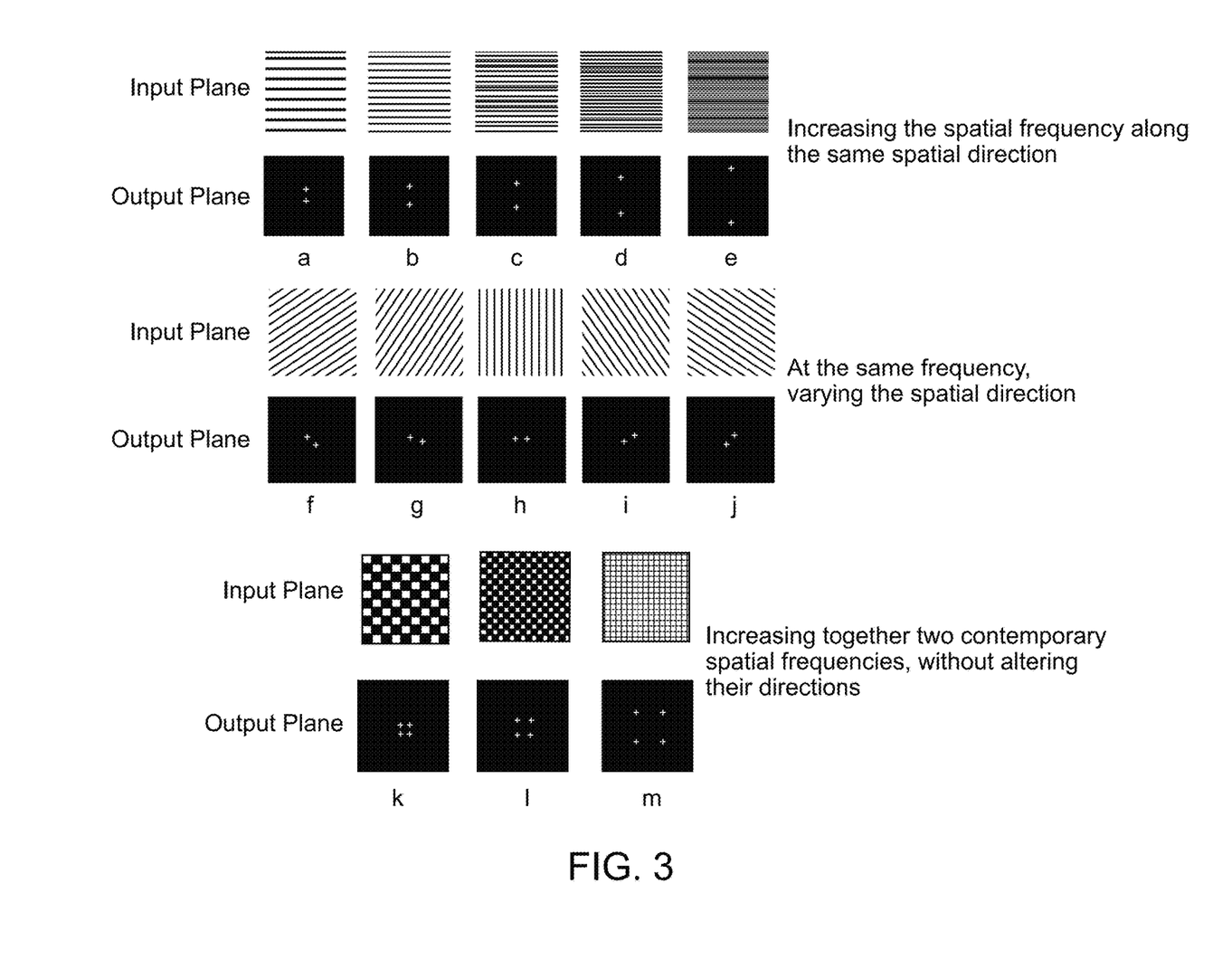
FIG. 3 shows various examples of incident (or input) light waves to a varifocal lens of the imaging system and the corresponding output light waves, according to example embodiments.

Referring to FIG. 3, various examples of incident (or input) light waves 125a or 125b after passing through a known transparent pattern 132 positioned on the rear focal plane or input plane 126 and the corresponding output incident light waves 125c at the output of focal plane 128 (or the corresponding reflected light wave 125d) are shown, according to example embodiments. In each of the examples (a) to (m) of FIG. 3, the upper image (denoted as "Input Plane") represents a two-dimensional (2D) view of the incident light wave 125a or 125b after passing through a known transparent pattern 132 positioned on the rear focal plane or input plane 126 and the lower image (denoted as "Output Plane") represents a 2D view of the corresponding output incident light wave 125c at the front focal. The incident light waves 125a or 125b in the examples (a) to (m) represent different examples of planar light waves passed through different known transparent patterns 132 positioned on the rear focal plane or input plane 126. In each of the examples (a) to (m), the output incident light wave 125c or 125d represents the spatial Fourier transform of the corresponding input parallel incident light wave 125b after passing through different known transparent patterns 132 positioned on the rear focal plane or input plane 126. Each of the output incident light waves 125c or 125d in the examples (a) to (m) depicts or forms a corresponding pattern (also referred to as corresponding frequency pattern) including multiple bright blobs. The number and locations of the blobs depends on the spatial frequency components of the corresponding parallel incident light wave 125b after passing through a known transparent pattern 132 positioned on the rear focal plane or input plane 126.

Referring back to FIGS. 1 and 2, the method 200 may include the image sensor 106 receiving a reflected light wave 125d version of the spatial Fourier transform 125c carried by the light wave 125b at step 204. The object 130 may be placed at a fixed location with respect to the imaging system 100. The output incident light wave 125c produced by the varifocal lens 104 (representing the spatial Fourier transform carried by the incident light wave 125b after passing through a known transparent pattern 132 positioned on the rear focal plane or input plane 126) may be reflected back by the object 130. The image sensor 106 may receive the reflected light wave 125d that is reflected from the object 130 through the focus tunable lens 108. Referring back to FIG. 3, the lower image (denoted as "Output Plane") in each of the examples (a) to (m) may be viewed as the image that is captured by the image sensor 106 when the corresponding incident light wave 125a is emitted by the light source 102, the upper image (denoted as "Input Plane") in each of the examples (a) to (m) is a semi-transparent pattern 132 positioned on the rear focal plane or input plane 126 and when both the varifocal lens 104 and the focus tunable lens 108 have the correct focus.

The method 200 may include adjusting a focal length of the varifocal lens 104 to cause the Fourier transform 125c carried by the parallel incident light wave 125b after passing through a known semi-transparent pattern 132 positioned on the rear focal plane or input plane 126 to form a predefined pattern detected by the image sensor at step 206, and adjusting a control parameter of the focus tunable lens 108 to cause one or more spatial frequencies of the predefined pattern detected at the image sensor to match one or more predefined spatial frequencies at step 208. The processor 110 may be communicatively or operatively connected to the varifocal lens 104, the focus tunable lens 108, and/or actuators thereof (not shown in FIG. 1). In general, the processor 110 may cause the varifocal lens 104 and/or the focus tunable lens 108 to change respective focus based on an image recorded by the image sensor 106 until both lenses 104 and 108 have the correct focus given a fixed distance between the imaging system 100 and the object 130. Specifically, the processor 110 may cause the varifocal lens 104 and/or the focus tunable lens 108 to change respective focus(es) until an image recorded by the image sensor 106 depicts the predefined pattern with some predefined characteristics (e.g., characteristics representing predefined frequency features of the Fourier transform carried by the light wave). To achieve this goal, the processor 110 may employ various approaches or processes for adjusting the focus of the varifocal lens 104 and/or the focus tunable lens 108. In the following, an example approach is described for illustrative purposes. It is to be noted, however, that other approaches or variants of the approach described below may be employed.

Figure 4:
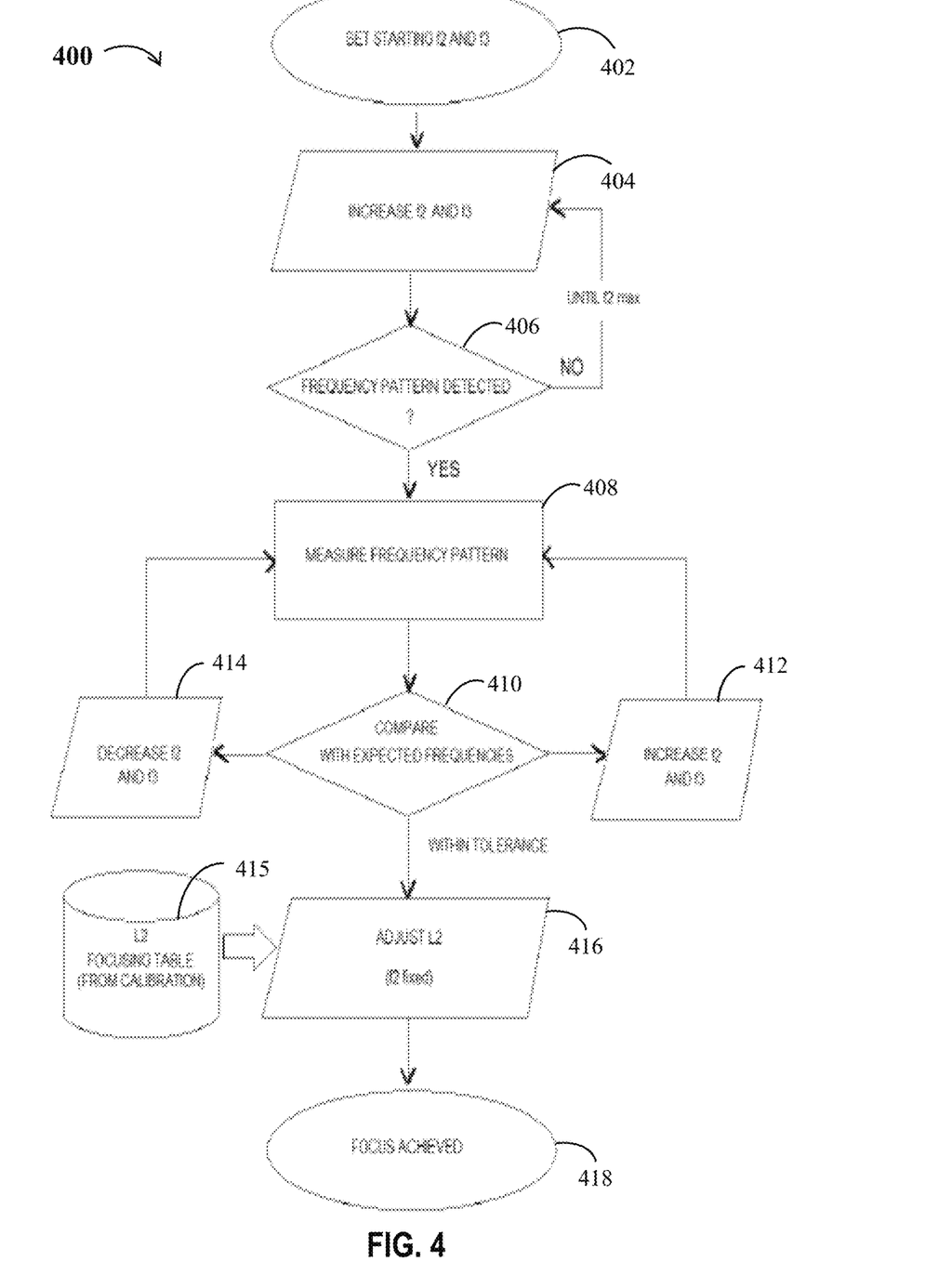
FIG. 4 shows a flowchart depicting an example method for adjusting the focus of a varifocal lens and/or a focus tunable lens of the imaging system, according to example embodiments.

Referring now to FIG. 4, a flowchart depicting an example method 400 for adjusting the focus of the varifocal lens 104 and/or the focus tunable lens 108 is shown, according to example embodiments. Referring to FIGS. 1 and 3, the method 400 may include the processor 110 setting (or causing to set) the focal length f2 of the varifocal lens 104 and the focal distance f3 of the focus tunable lens 108 to predefined initial values at step 402. For instance, the processor 110 may set the focal length f2 to a respective minimum $f2_{min}$ and set the focal distance f3 to a respective minimum $f3_{min}$.

The processor 110 may iteratively increase the focal length f2 and the focal distance f3 at step 404 until a predefined frequency pattern is detected in the image captured or acquired by the image sensor 106 at step 406. Referring back to FIG. 3, if the incident light wave in any of the examples (k)-(m) is used as the incident light wave 125a emitted by the light source 102 or as the parallel incident light wave 125b produced by the collimating lens 116 and then passing through a known semi-transparent pattern 132 positioned on the rear focal plane or input plane 126, the corresponding frequency pattern (e.g., the corresponding spatial Fourier transform output by the varifocal lens 104 and reflected back from the object 130 to be received by the image sensor 106) will have four separate blobs. The processor 110 may keep increasing the focal length f2 and the focal distance f3 until the image captured by the image sensor 106 depicts four separate blobs. The processor 110 may employ a pattern matching algorithm known in the art to detect the predefined frequency pattern in images captured or acquired by the image sensor 106. For example, and considering any of the examples (k) of FIG. 3, the processor 110 may use various stored versions (e.g., stored images) of the frequency pattern of the example (k). The various stored versions may differ with respect to the distances between the four blobs. At each iteration (e.g., after each adjustment of f2 and f3), the processor 110 may compute a separate distance between the image captured or acquired by the image sensor 106 and each of the stored versions of the predefined frequency pattern. The processor 110 may determine that the predefined frequency pattern is detected if any of the computed distances is below a predefined threshold.

Referring back to FIG. 4, detecting the predefined frequency pattern at step 406 does not necessarily mean that the frequency pattern is accurately depicted in the image captured or acquired by the image sensor 106 or that the varifocal lens 104 and the focal distance f3 have the correct focus. For instance, the distances between the blobs in the captured image may be different from those of the predefined frequency pattern. Accordingly, the processor 110 may fine-tune the focal length f2 of the varifocal lens 104 and/or the focal distance f3 of the focus tunable lens 108, upon detecting the frequency predefined pattern (or predefined pattern of the Fourier transform carried by the light wave passed through a known semi-transparent pattern 132 positioned on the rear focal plane or input plane 126).

The processor 110 may measure the frequency characteristics of the frequency pattern in the image acquired by the image sensor 106 at step 408. Measuring the frequency characteristics may include the processor 110 measuring the distances between the blobs in the acquired image. The distances between the blobs may be indicative of the frequency components of the Fourier transform carried by the light wave. The processor 110 may compare the measured frequency characteristics to predefined (or expected) frequency components and determine whether the difference between the two is or is not within a predefined tolerance value at step 410. For instance, the processor 110 may compare the measured distance(s) between the blobs in the acquired image to corresponding distance(s) between the blobs in the predefined frequency pattern (e.g., one of the output plane patterns in FIG. 3). If the difference between the measured and predefined frequency characteristics (or between the measured and predefined/expected distances) is not within the predefined tolerance value (e.g., less than 5% of the predefined/expected distance(s)), the processor 110 may either increase f2 and f3 at step 412 or decrease f2 and f3 at step 414.

To determine whether to increase f2 and f3 at step 412 or to decrease f2 and f3 at step 414), the processor 110 may compare an instant or current difference between the measured and predefined frequency characteristics (or between the measured and predefined/expected distances) to the difference recorded in the previous iteration. If the difference decreased in the current iteration, the processor 110 may stay the course and apply the same adjustment as in the previous iteration. That is, if f2 and f3 increased in the previous iteration, then the processor 110 increases f2 and f3 at step 412 in the current iteration, and if f2 and f3 decreased in the previous iteration, then the processor 110 decreases f2 and f3 at step 414 in the current iteration. However, if the difference between the measured and predefined frequency characteristics (or between the measured and predefined/expected distances) is increased in the current iteration compared to the previous iteration, the processor 110 may reverse course and apply an opposite adjustment compared to the previous iteration. That is, if f2 and f3 increased in the previous iteration, then the processor 110 decreases f2 and f3 at step 412) in the current iteration, and if f2 and f3 were decreased in the previous iteration, then the processor 110 increases f2 and f3 at step 414) in the current iteration. The reason behind these decisions is explained or understood in view of FIG. 5.

Figure 5:
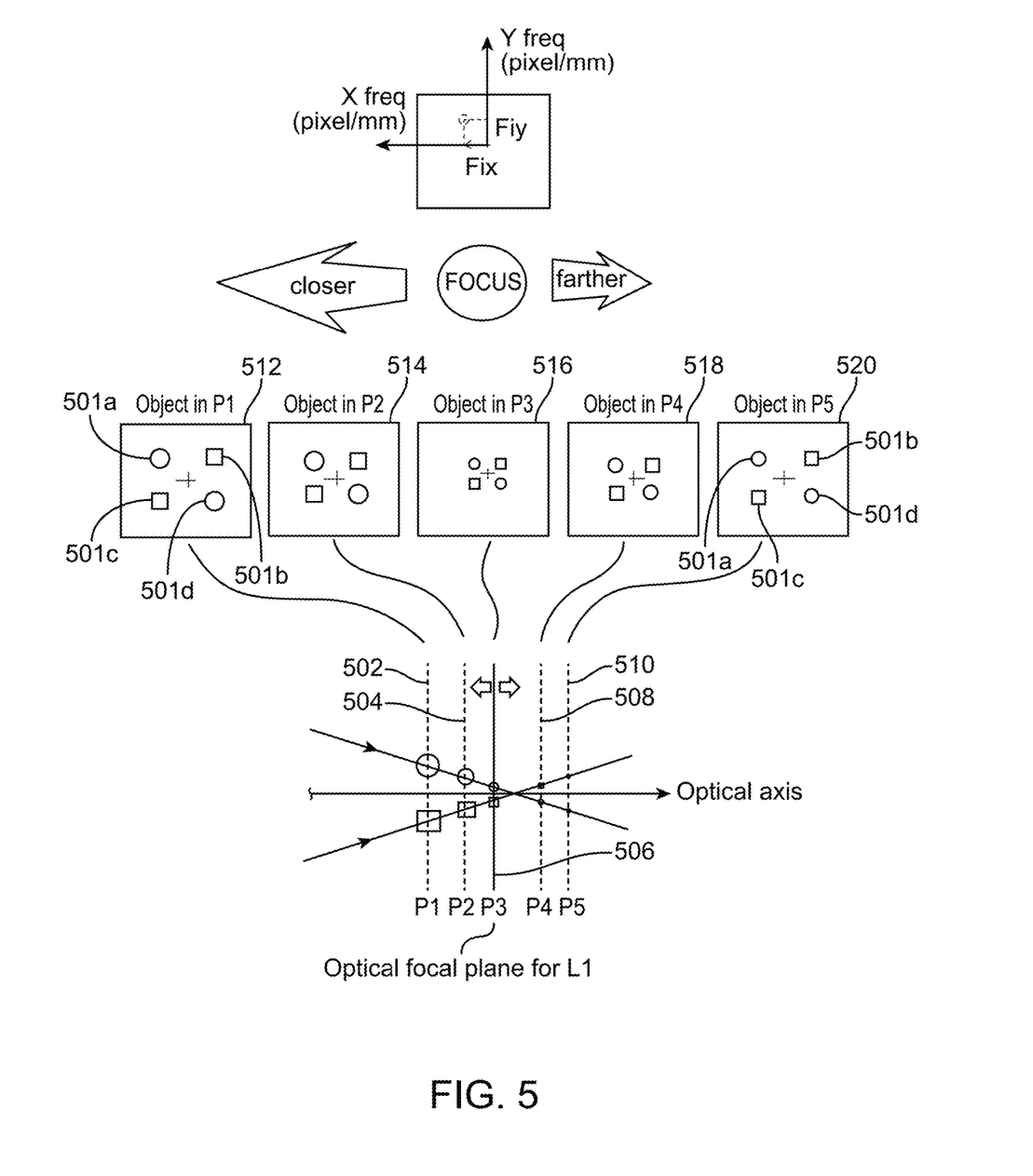
FIG. 5 shows a diagram illustrating the change in frequency characteristics (or distances between frequency pattern blobs) in terms of different focal planes, according to an example embodiments.

Referring to FIG. 5, a diagram illustrating the change in frequency characteristics (or distances between frequency pattern blobs 501a-501d (collectively 501) in terms of different focal planes is shown, according to an example embodiments. Considering five different focal planes 502, 504, 506, 508 and 510 for the varifocal lens 104, assume that the focal plane 506 is the correct focal plane that results in the correct focus for the varifocal lens 104. The images 512, 514, 516, 518 and 520 represent the images acquired by the image sensor 106 when the focus of the varifocal lens 104 is at the focal planes 502, 504, 506, 508 and 510, respectively. The distances between the blobs 501 increase as the actual focal plane gets farther away from the correct focal plane 506 in either direction. The distances between the blobs 501 reach their minimum when the focus of varifocal lens 104 is at the correct focal plane 106. As the actual focal plane moves towards the correct focal plane 506 from either directions (e.g., moving from focal plane 502 to focal plane 504 or moving from focal plane 510 to focal plane 508), the distances between the blobs 501 decrease. When the actual focal plane moves away from the correct focal plane 506 in either directions (e.g., moving from focal plane 504 to focal plane 502 or moving from focal plane 508 to focal plane 510), the distances between the blobs 501 increase. Therefore, if the processor 110 detects that the measured distances between the blobs 501 are increasing or the difference between the measured distances and the expected distances is increasing, the processor reverses course with respect to adjusting f2 and B.

Referring back to FIG. 4, if the processor 110 determines that the difference between the measured and predefined frequency characteristics (or between the measured and predefined/expected distances) is within the predefined tolerance value at step 410), the processor 110 may further fine tune f3 using a focusing table 415 of the focus tunable lens 108 at step 416. The focusing table 415 may be generated during a calibration phase of the focus tunable lens 108. The processor 110 may fine tune f3 by choosing, from the focusing table of the focus tunable lens 108, few rows (e.g., corresponding to few values of f3) above and below the focal distance f3 estimated in steps 408, 410, 412, 414. The processor 110 may compared the frequency characteristics (or distances between the blobs 502) of the acquired images corresponding to the few chosen values of f3 to the expected frequency characteristics (e.g., as discussed above with regard to step 410) and select the f3 values that results in the best frequency compliance with the expected frequency characteristics. The fine tuning of the focal distance f3 of the focus tunable lens 108 at step 416 may help compensate for noisy measurements in the previous phase (e.g., in previous steps of the method 400). The L2 focusing table 415 may be generated during a calibration phase and may be locally stored in the memory 118. The focusing table 415 in the case of liquid tunable lens may have two columns, voltage vs focal distance f3, and many rows corresponding to different (voltage, f3) pairs.

The compliance in frequency characteristics between (or in distances between blobs 501 of frequency patterns of) the acquired image or pattern and the expected pattern (e.g., one of the output plane patterns of FIG. 3) implies that both the varifocal lens 104 and the focus tunable lens 108 have achieved the correct focus or correct focal planes at step 418. The method 400 ends at step 418.

It is to be noted that method 400 shown in FIG. 4 represents an example implementation for adjusting the focal planes of the varifocal lens 104 and/or the focus tunable lens 108. Other implementations may be used to achieve similar results. For example, at step 402, the processor may set the focal length f2 to a corresponding maximum value $f2_{max}$ and set the focal distance f3 to a corresponding maximum value $f3_{max}$. In such implementations, the processor 110 may decrease f2 and f3 (instead of increasing f2 and f3) in step 404 until the predefined frequency pattern is detected at step 406. Also, in steps 412 and 414, the processor may adjust the amount by which f2 and f3 are adjusted depending on how close the current estimates are from the corresponding desired values.

Referring back to FIG. 2, in adjusting the focal length of the varifocal lens 104 at step 206 and/or adjusting the control parameter of the focus tunable lens 108, the processor 110 may send a control signal to the varifocal lens 104, a control signal to the focus tunable lens 108 or controllers thereof (not shown in FIG. 1). The focus tunable lens 108 may be a liquid lens and adjusting the control parameter may include adjusting a voltage of the focus tunable lens 108.

Figure 6A:
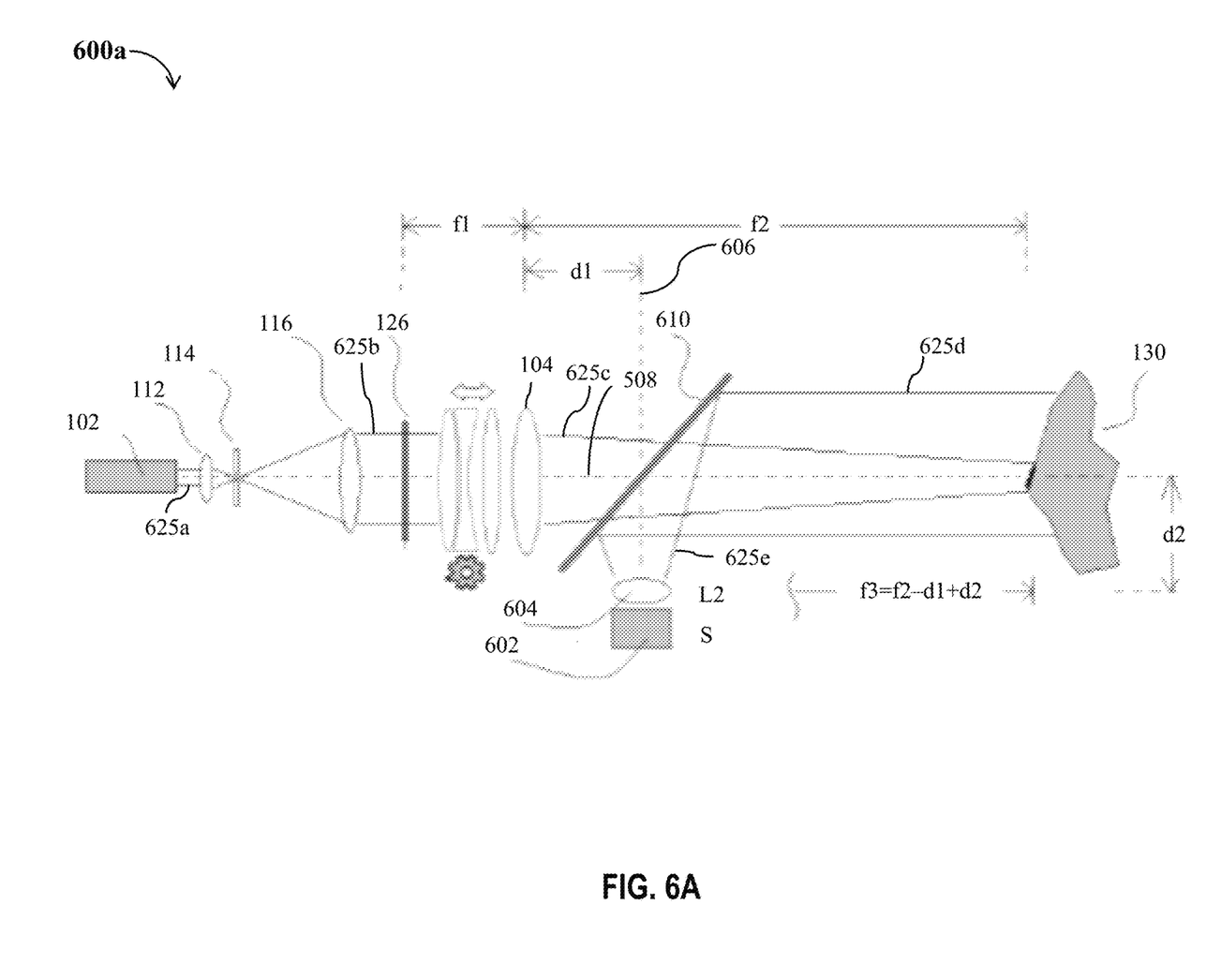
FIGS. 6A and 6B show two different architectures of the imaging system are shown, according to example embodiments.
Figure 6B:
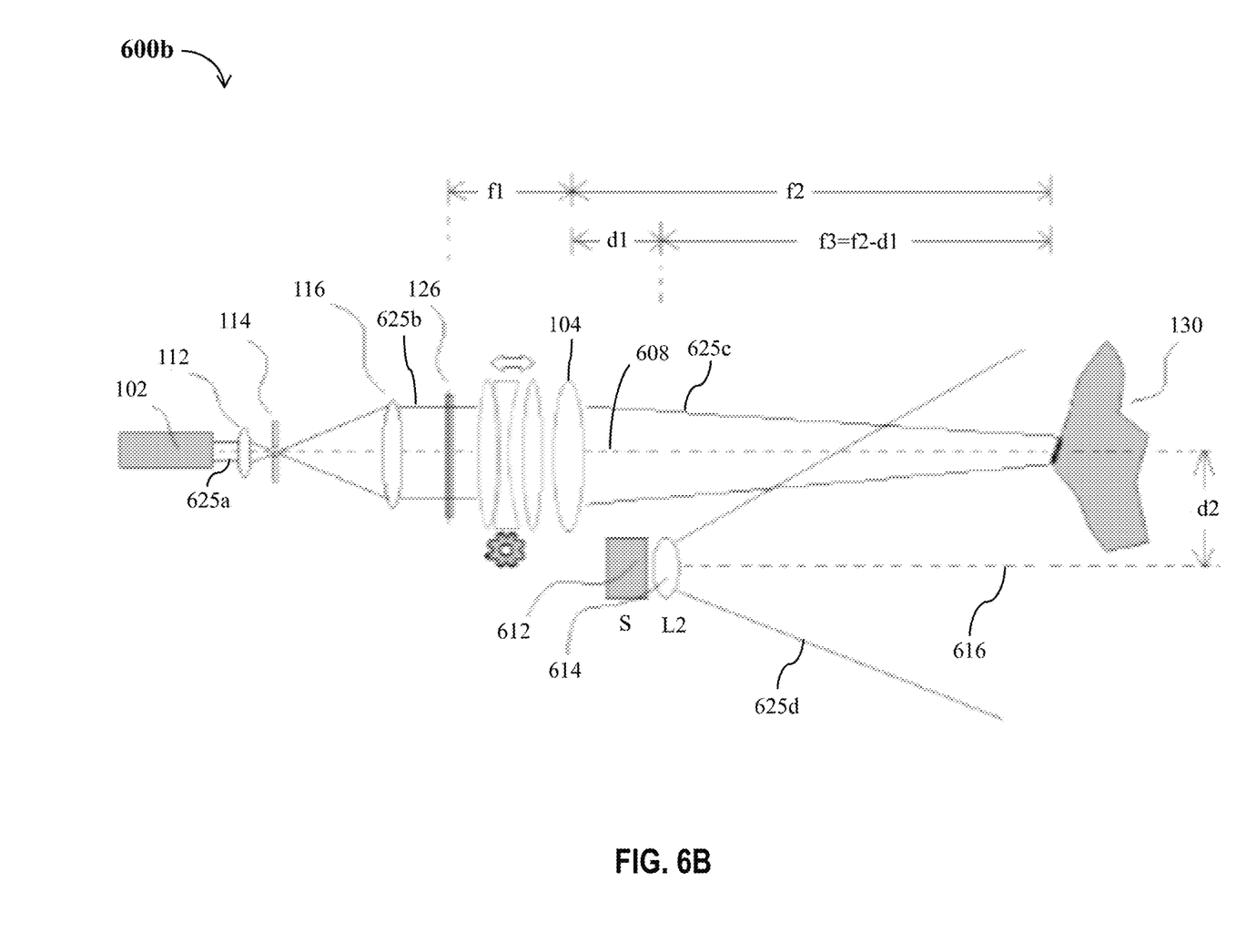

Referring now to FIGS. 6A and 6B, two different architectures 600a and 600b of the imaging system 100 are shown, according to example embodiment. Specifically, FIGS. 6A and 6B depict two alternatives for mounting or assembling different optical components of the imaging system 100. In the architecture 600a of FIG. 6A, the image sensor 602 and the focus tunable lens 604 may be arranged such that an optical axis 606 of the focus tunable lens 604 is transverse to (e.g., perpendicular or at an angle less than 90° with) an optical axis 608 of the varifocal lens 104. Similar to the system 100 of FIG. 1, the light source may emit an incident light wave 625a that is transformed to a parallel light wave 625b and passes through a known semi-transparent pattern 132 positioned on the rear focal plane or input plane 126 of the varifocal lens 104. The output light wave 625c produced by the varifocal lens 104 represents the spatial Fourier transform carried by the parallel light wave 625b after passing through a known semi-transparent pattern 132 positioned on the rear focal plane or input plane 126. The imaging system 100 may include an optical path splitter 610 arranged to direct the light wave 625d reflected from the object 130 (e.g., a reflection of output light wave 625c representing the Fourier transform of the parallel incident light wave 625b) towards the focus tunable lens 604. The optical path splitter 610 may include (or may be) a semi-transparent mirror, such that the incident light wave 625c passing through the varifocal lens 104 may pass through the optical path splitter 510 to reach the object 130 while the light wave 625d reflected back from the object 130 is redirected (e.g., through reflection from the optical path splitter 510) as light wave 625e towards the focus tunable lens 610.

In the architecture 600b of FIG. 6B, the image sensor 612 and the focus tunable lens 614 may be arranged such that the optical axis 616 of the focus tunable lens 614 is parallel to the optical axis 608 of the varifocal lens 104. The light waves 625a, 625b, 625c and 625d are similar to those described in FIG. 6A.

Figure 7A:
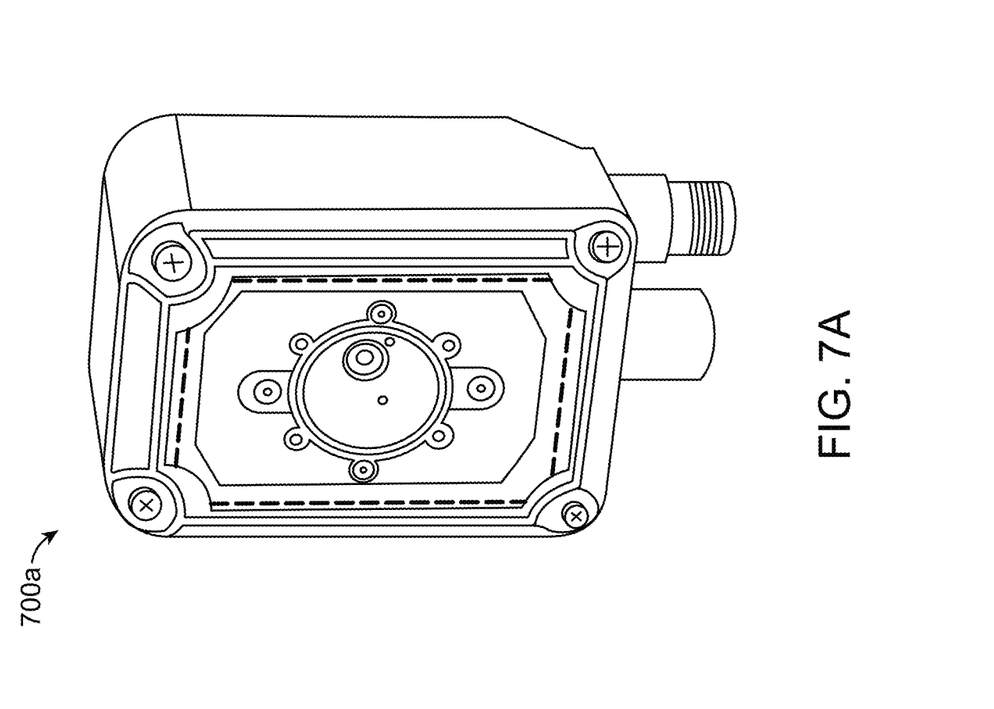
FIGS. 7A and 7B show two example imaging devices in which the imaging system may be integrated, according to example embodiments.
Figure 7B:
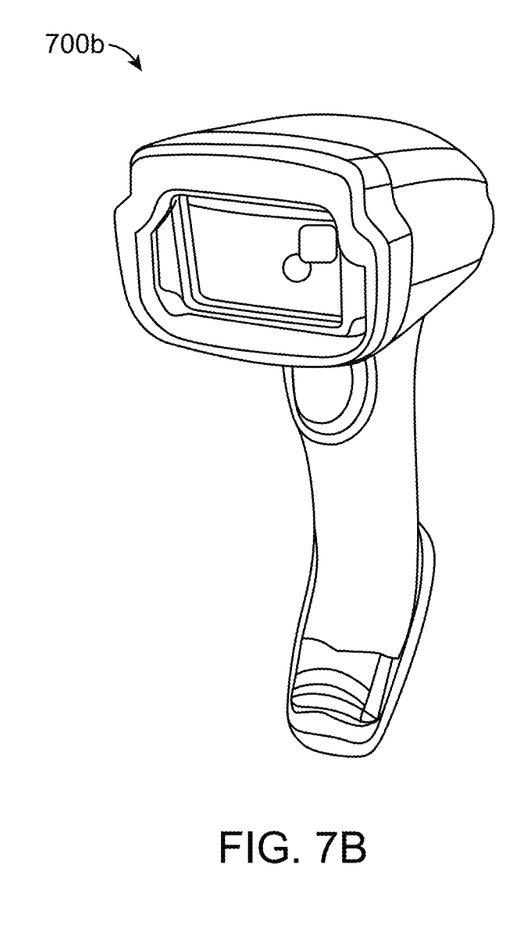

Referring now to FIGS. 7A and 7B, two example imaging devices 700a and 700b in which the imaging system 100 may be integrated are shown, according to example embodiments. The device 700a is a stationary 2D reader for reading bar codes. Stationary 2D readers adopt different focus technologies based on liquid lenses or electrical motors. Liquid lenses use electrical charges to change the shape of the interface between oil and water. Changing the shape of the interface between oil and water bends the light and brings the image into focus quickly without any moving parts. Changing the external voltage applied to the lens driver leads to a different focal point. Each reader that integrates these lenses is usually calibrated during the production process. A calibration table is built containing the couple voltage-focus distance. Existing stationary 2D reader devices do not use any active distance sensor to detect the target distance. So, the operating reading distance is set by the end user at configuration time: entering it directly through the GUI or using an automatic procedure to detect the focus distance. Other stationary 2D reader devices use an electric motor to move the focal lenses. At the moment there are no stationary 2D reader devices with active distance sensors to estimate the target distance (neither dynamically nor statically) and there are no stationary 2D reader devices with multi-focal lenses (autozoom+autofocus). The imaging system 100 of FIG. 1 may be implemented in stationary 2D reader devices to allow for a more accurate detection of the optimal focus point compared to using image gradient or energy estimation.

The device 700b is a hand-held device (HHD) for reading bar codes. Some HHDs use focus systems to extend the operating range (from centimeters to several meters). The POWERSCAN™ PD95X1 AR SERIES may use a reading module that integrates an electric motor capable of changing the focus distance, the reading range goes from 15 cm to 20 meters. Within the first meters (2-3 meters) they use a time of flight (ToF) sensor to measure the target distance, in this way the reader is very prompt to focus the target and get to set optimal condition to read the barcode. Outside of the first meters no distance sensor is used. Instead, the reader does several attempts to find the optimal focus distance through the analysis of the acquired images (contrast and energy estimation in specific regions-of-interest of the acquired image). In this way the reader promptness becomes slower. The HHD 700b may employ the imaging system 100 of FIG. 1, where instead of using the (ToF) sensor, the HHD 700b may perform the autofocus method 200 of FIG. 2 for different distances. At runtime (e.g., when reading barcodes), the HHD 700b may acquire multiple images associated with different distances for each reading event and use the best image among the acquired images. The user may input a range of distances to reduce the number of images that are to be acquired in each reading event.

Although example architectures of the imaging system 100 has been described in FIGS. 6A and 6B, these architectures are not to be construed as limiting. The optical components of the imaging system 100 may be mounted in various other ways. It should further be understood that while the processes described herein refer to the architectures of the imaging system 100, but that the processes may be associated with alternative configurations of an imaging system that provides the same or similar functionality. Implementations of the subject matter and the operations described in this specification may be implemented using optical components, digital electronic circuitry, computer software embodied on a tangible medium, firmware and/or hardware, including the structures disclosed in this specification and their structural equivalents, or in combinations of one or more of them. The subject matter described in this specification (e.g., methods 200 and 400 of respective FIGS. 2 and 3 and/or steps thereof) may be implemented as one or more computer programs, e.g., one or more modules of computer program instructions, encoded on one or more computer storage media for execution by, or to control the operation of, data processing apparatus. Alternatively or in addition, the program instructions may be encoded on an artificially-generated propagated signal, e.g., a machine-generated electrical, optical, or electromagnetic signal that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this specification may be performed by a data processing apparatus on data stored on one or more computer-readable storage devices or received from other sources.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory may be supplemented by, or incorporated in, special purpose logic circuitry.

To provide for interaction with a user, implementations of the subject matter described in this specification may be implemented on a computing device having a display device, e.g., a CRT (cathode ray tube) or LCD monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations may also be implemented in combination in a single implementation. Conversely, various features described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. An imaging system comprising:
    a light source for generating a light wave;
    a varifocal lens arranged in front of the light source, the varifocal lens configured to receive the light wave passed through a known semi-transparent pattern positioned on a rear focal plane of the varifocal lens and generate a Fourier transform of the semi-transparent pattern therefrom;
    an image sensor arranged to receive the Fourier transform carried by the light wave after being reflected from an object;
    a focus tunable lens arranged in front of the image sensor and through which the reflected light wave passes; and
    a processor configured to:
    adjust a focal length of the varifocal lens to cause the Fourier transform carried by the light wave to form an expected predefined pattern detected by the image sensor; and
    adjust a control parameter of the focus tunable lens to cause one or more spatial frequencies of the predefined pattern detected at the image sensor to match one or more predefined spatial frequencies.

2. The imaging system of claim 1, wherein the focus tunable lens is arranged such that an optical axis of the focus tunable lens is transverse to an optical axis of the varifocal lens, the imaging system further comprising an optical path splitter arranged to direct the Fourier transform carried by the light wave reflected from the object towards the focus tunable lens.

3. The imaging system of claim 2, wherein the optical path splitter includes a semi-transparent mirror.

4. The imaging system of claim 1, wherein the focus tunable lens is arranged such that an optical axis of the focus tunable lens is parallel to an optical axis of the varifocal lens.

5. The imaging system of claim 1, wherein the processor is further configured to fine-tune the focal length of the varifocal lens upon detecting the expected predefined pattern of the Fourier transform carried by the light wave.

6. The imaging system of claim 5, wherein in fine-tuning the focal length of the varifocal lens, the processor is configured to:
determine a distance between two blobs in an image captured by the camera sensor and representing the Fourier transform carried by the light wave; and
modify the focal distance of the varifocal lens based on the distance between two blobs.

7. The imaging system of claim 1, wherein the light wave is a planar light wave.

8. The imaging system of claim 1, wherein the focus tunable lens is a liquid lens and the control parameter includes a control voltage of the liquid lens.

9. The imaging system of claim 1, wherein the light source is a laser.

10. The imaging system of claim 1, wherein the processor, in adjusting the control parameter of the focus tunable lens, is further configured to control position of a focusing table.

11. A method comprising:
emitting, by a light source, a light wave to propagate through a varifocal lens arranged in front of the light source, the varifocal lens configured to receive the light wave passed through a known semi-transparent pattern positioned on a rear focal plane of the varifocal lens and generate a Fourier transform of the semi-transparent pattern;
receiving, by an image sensor via a focus tunable lens, the Fourier transform carried by the light wave after being reflected from an object;
adjusting, by a processor, a focal length of the varifocal lens to cause the Fourier transform of the light wave to form an expected predefined pattern detected at the image sensor; and
adjusting, by the processor, a control parameter of a focus tunable lens arranged in front of the image sensor until one or more spatial frequencies of the predefined pattern detected at the image sensor match one or more predefined spatial frequencies.

12. The method of claim 11, wherein the focus tunable lens is arranged such that an optical axis of the focus tunable lens is transverse to an optical axis of the varifocal lens, the method further comprising directing, by an optical path splitter, the Fourier transform of the light wave reflected from the object towards the focus tunable lens.

13. The method of claim 11, further comprising:
measuring a frequency pattern created by the Fourier transform;
comparing the frequency pattern with an expected frequency pattern to determine a difference between the frequency pattern and the expected frequency pattern; and
altering the focal length of the varifocal lens and focal distance of the focal tunable lens in response to determining that the difference between the frequency pattern and the expected frequency pattern is outside of a tolerance.

14. The method according to claim 13, further comprising:
in response to determining that the difference between the frequency pattern and the expected frequency pattern decreased from a previous iteration, then decreasing the focal length of the varifocal lens and focal distance of the focal tunable lens;
otherwise, in response to determining that the difference between the frequency pattern and the expected frequency pattern increased from a previous iteration, then increasing the focal length of the varifocal lens and focal distance of the focal tunable lens.

15. The method according to claim 14, further comprising repeatedly measuring the frequency pattern, comparing the frequency pattern with the expected frequency pattern, and altering the focal length of the varifocal lens and focal distance of the focal tunable lens.

16. The method according to claim 13, further comprising adjusting a focusing table established by performing a calibration.

17. The method according to claim 11, further comprising aligning an optical axis of the focus tunable lens to be traverse to an optical axis of the varifocal lens.

18. The method of claim 11, wherein the focus tunable lens is arranged such that an optical axis of the focus tunable lens is parallel to an optical axis of the varifocal lens.

19. The method of claim 11, further comprising fine-tuning, by the processor, the focal length of the varifocal lens upon detecting the predefined pattern of the Fourier transform carried by the light wave.

20. The method of claim 19, wherein fine-tuning the focal length of the varifocal lens includes:
determining, by the processor, a distance between two blobs in an image captured by the camera sensor and representing the Fourier transform of the light wave; and
modifying, by the processor, the focal distance of the varifocal lens based on the distance between two blobs.

* * * * *